(12) United States Patent
Begeja et al.

(10) Patent No.: US 8,792,627 B2
(45) Date of Patent: Jul. 29, 2014

(54) METHOD AND APPARATUS FOR DELIVERING RELEVANT CONTENT

(75) Inventors: Lee Begeja, Gilette, NJ (US); Giuseppe Di Fabbrizio, Florham Park, NJ (US); Charles Alfred Lewis, Greenburgh, NY (US); Benjamin J. Stern, Morris Township, NJ (US); Jay Wilpon, Warren, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1510 days.

(21) Appl. No.: 11/556,628

(22) Filed: Nov. 3, 2006

(65) Prior Publication Data

US 2008/0107100 A1    May 8, 2008

(51) Int. Cl.
*H04M 15/00*    (2006.01)

(52) U.S. Cl.
USPC .................. 379/114.13; 379/133; 379/211.01

(58) Field of Classification Search
CPC ............. H04M 15/58; H04M 3/2218; H04M 2203/551; H04M 3/2281; H04M 3/4878; H04M 2215/0188
USPC .................... 379/201.01, 211.01, 70, 114.13; 704/251, 270
See application file for complete search history.

(56) References Cited

U.S. PATENT DOCUMENTS

| | | | | |
|---|---|---|---|---|
| 5,771,273 | A * | 6/1998 | McAllister et al. | 379/88.01 |
| 7,400,711 | B1 * | 7/2008 | Ford et al. | 379/70 |
| 8,209,175 | B2 * | 6/2012 | Mukerjee et al. | 704/251 |
| 2001/0054085 | A1 * | 12/2001 | Kurganov | 709/218 |
| 2002/0114437 | A1 * | 8/2002 | Nabkel et al. | 379/201.01 |
| 2003/0027559 | A1 * | 2/2003 | Umstetter et al. | 455/415 |
| 2004/0091093 | A1 * | 5/2004 | Bookstaff | 379/201.01 |
| 2006/0067497 | A1 * | 3/2006 | Erhart et al. | 379/201.01 |
| 2008/0059198 | A1 * | 3/2008 | Maislos et al. | 704/273 |
| 2010/0017210 | A1 * | 1/2010 | Blaker et al. | 704/251 |
| 2010/0063880 | A1 * | 3/2010 | Atsmon et al. | 705/14.53 |

FOREIGN PATENT DOCUMENTS

| | | |
|---|---|---|
| EP | 1641229 | 3/2006 |
| EP | 1241886 | 9/2006 |

OTHER PUBLICATIONS

PCT Search Report and Written Opinion for PCT/US2007/083001, dated May 27, 2008, copy consists of 11 unnumbered pages.

* cited by examiner

*Primary Examiner* — Oleg Asanbayev

(57) ABSTRACT

A method and apparatus for providing a relevant content delivery service on networks such as packet networks, e.g., Voice over Internet Protocol (VoIP) and Service over Internet Protocol (SoIP) networks are disclosed. For example, the present method receives a request to initiate a call from a calling party to a called party. The method then establishes a communication connection between the calling party and the called party and a communication connection to a speech recognizer. The method monitors a conversation between the calling party and the called party using the speech recognizer for detecting one or more verbal triggers. Finally, the method delivers relevant content that is associated with any detected verbal triggers to the calling party and/or the called party.

20 Claims, 4 Drawing Sheets

METHOD AND APPARATUS FOR DELIVERING RELEVANT CONTENT

The present invention relates generally to communication networks and, more particularly, to a method for delivering relevant content to a user based upon a monitored conversation on a network, such as a packet network, e.g., Voice over Internet Protocol (VoIP) and Service over Internet Protocol (SoIP) networks.

BACKGROUND OF THE INVENTION

As extremely high bandwidth access networks become more accessible to residential subscribers, the high bandwidth networks enable service providers to integrate voice, video, and data, thereby providing more convenience for end customers and creating new service opportunities. The Internet based voice and data services provide consumers with greater flexibility and control over various subscribed services. As customers receive integrated voice and data services, customers may wish to receive information relevant to an on-going conversation during a call. For example, if a customer calls a travel agent and is talking to the travel agent regarding a vacation, the customer may desire to receive competing quotes, e.g., from other travel agents, alternative air fares from airlines, hotel rates from similar class hotels, and the like, prior to finalizing any traveling plans. Although a customer may certainly call different travel agents, airlines, hotels, to obtain a plurality of different traveling options with different rates, having such competing or alternative information during a current call may be advantageous for negotiating prices, receiving better accommodations, etc. Unfortunately, customers currently must research the information by contacting other providers of similar services one at a time. This approach is time consuming and puts the burden for finding relevant content on the customer.

Therefore, there is a need for a method and apparatus that enables a network service provider to deliver relevant content to a user based upon a monitored conversation.

SUMMARY OF THE INVENTION

In one embodiment, the present invention discloses a method and apparatus for providing a relevant content delivery service on networks such as packet networks, e.g., Voice over Internet Protocol (VoIP) and Service over Internet Protocol (SoIP) networks. For example, the present method receives a request to initiate a call from a calling party to a called party. The method then establishes a communication connection between the calling party and the called party and a communication connection to a speech recognizer. The method monitors a conversation between the calling party and the called party using the speech recognizer for detecting one or more verbal triggers. Finally, the method delivers relevant content that is associated with any detected verbal triggers to the calling party and/or the called party.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
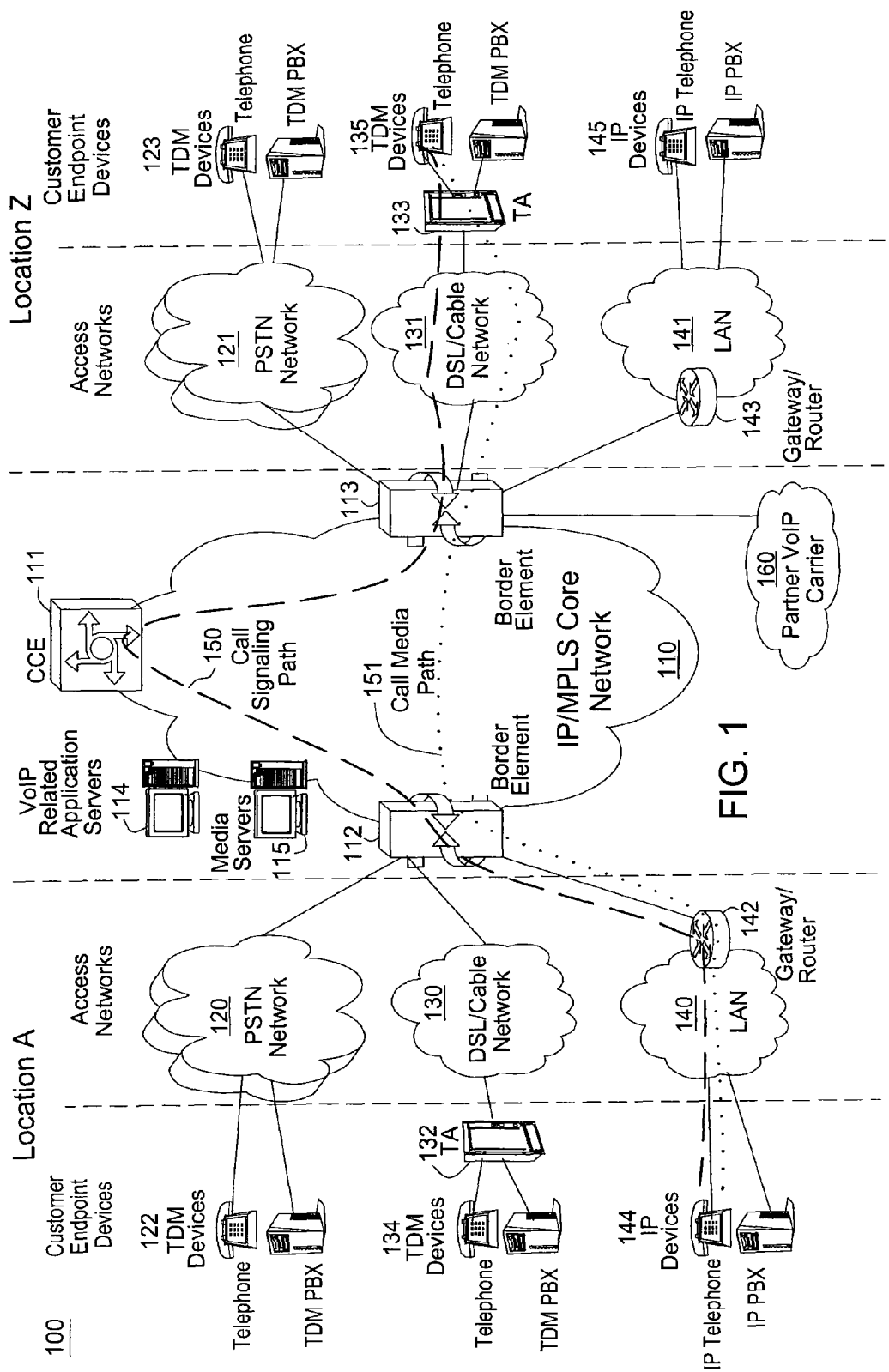
FIG. 1 illustrates an illustrative Voice over Internet Protocol (VoIP) network related to the present invention.
Figure 2:
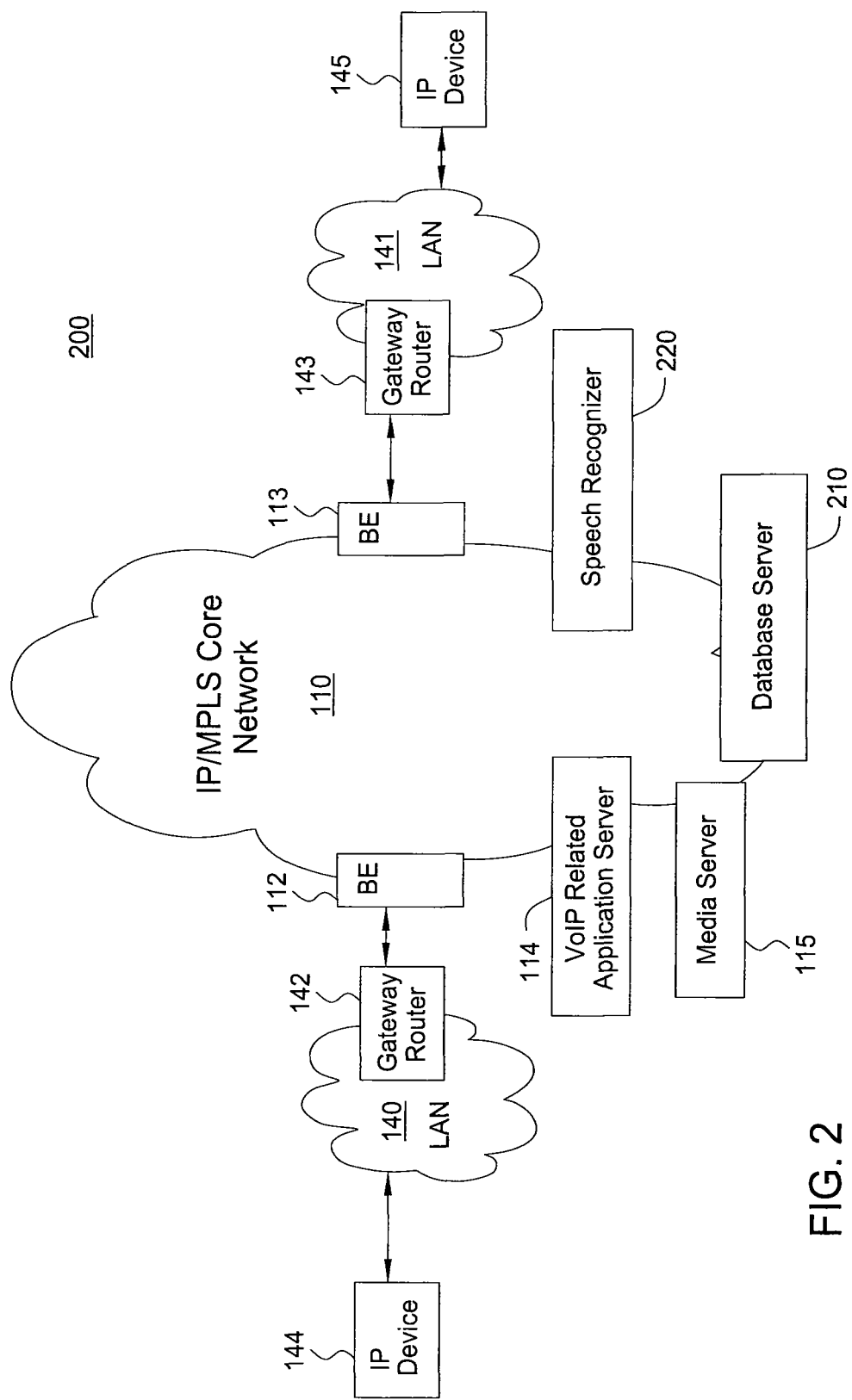
FIG. 2 illustrates an illustrative network with one embodiment of the invention for providing relevant content delivery service.

The present invention broadly discloses a method and apparatus for delivering relevant content on networks such as the packet networks, e.g., Voice over Internet Protocol (VoIP) and Service over Internet Protocol (SoIP) networks. Although the present invention is discussed below in the context of transporting packets in VoIP and SoIP networks, the present invention is not so limited. Namely, the present invention can be adapted to other packet networks, cable networks, wireless networks, time division multiplexed networks, and the like. Furthermore, the exemplary networks as shown in FIG. 1 and FIG. 2 below are only illustrative and should not be interpreted as a limitation to the present invention. Namely, any networks that may be used for delivering content as disclosed below are within the scope of the present invention.

To better understand the present invention, FIG. 1 illustrates an exemplary network 100, e.g., a packet network such as a VoIP network related to the present invention. Exemplary packet networks include Internet protocol (IP) networks, Asynchronous Transfer Mode (ATM) networks, frame-relay networks, and the like. An IP network is broadly defined as a network that uses Internet Protocol to exchange data packets. Thus, a Voice over Internet Protocol (VoIP) network or a Service over Internet Protocol (SoIP) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted to be limited by the particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary inter-working functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such the Border Element (BE) 112 and 113, the Call Control Element (CCE) 111, VoIP related Application Servers (AS) 114, and Media Server (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that require certain service specific features, e.g. translation of an E.164 voice network address into an IP address.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related application server 114 to obtain the information to complete this call. In one embodiment, the Application Server (AS) functions as a SIP back-to-back user agent. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the called party accepts the call at location Z, a call acknowledgement signaling message, such as a SIP 200 OK response message if SIP is used, is sent in the reverse direction back to the CCE 111. After the CCE 111 receives the call acknowledgement message, it will then send a call acknowledgement signaling message, such as a SIP 200 OK response message if SIP is used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. Note that the call signaling path and the call media path are different because once a call has been setup up between two endpoints, the CCE 111 does not need to be in the data path for actual direct data exchange.

Media Servers (MS) 115 are special servers that typically handle and terminate media streams, and to provide services such as announcements, bridges, transcoding, and Interactive Voice Response (IVR) messages for VoIP service applications. Note that a customer in location A, using any endpoint device type with its associated access network type, can communicate with another customer in location Z, using any endpoint device type with its associated network type.

As extremely high bandwidth access networks become more accessible to residential subscribers, the high bandwidth networks enable service providers to integrate voice, video, and data, thereby providing more convenience for end customers and creating new service opportunities. The Internet based voice and data services offer consumers much greater flexibility and control over various services. For example, a customer may wish to receive information relevant to an on-going conversation during a call. For example, if a customer calls a travel agent and is talking to the travel agent regarding a vacation, the customer may desire to receive competing quotes, e.g., from other travel agents, alternative air fares from airlines, hotel rates from similar class hotels, and the like, prior to finalizing any traveling plans. The ability to access relevant information during an on-going conversation allows a customer to have the ability to apply the presented relevant information immediately during the present call. Therefore, there is a need for a method and apparatus that enables a network service provider to provide a service that enables customers to receive relevant content.

The current invention discloses a method and apparatus for providing a relevant content delivery service on networks such as the packet networks, e.g., VoIP and SoIP networks. For example, if a customer subscribes to a service that delivers relevant content, the method analyzes the customer's conversations to detect triggers for pre-determined contents and delivers the pre-determined contents to the customer and/or the other party in the conversation. In order to clearly illustrate the teachings of the current invention, the following terminologies and technologies will first be described:

Relevant content;
Verbal triggers; and
Speech recognizer.

Relevant content refers to content relevant to a conversation. For example, if a conversation between a calling and called party refers to a planned vacation in England, then a speech recognizer as defined below may detect "England" and "vacation" in the conversation. Relevant content may then be one or more advertisements for a vacation, weather report, news, hotel rates, airfares, related to England. Relevant contents are determined in accordance with the requirements of a particular application.

Verbal trigger refers to a word, a phrase, a set of words, etc. associated with a relevant content. In the above example, "England" and "vacation" are verbal triggers for advertisements, weather reports, news, etc. related to England. Verbal triggers are determined in accordance with the requirements of a particular application.

Speech recognizer refers to a software and/or hardware module that processes speech to convert a speech signal to a set of words. The speech recognizer may include a natural language grammar for recognizing words, sentences, phrases, etc. For example, "word spotting" may be performed using "garbage" models that model general speech to differentiate speech from background noise and silence. Alternatively, a large general stochastic language model, with thousands or more vocabulary words, might be used. For example, this language model, trained on a large number of telephone calls, would in effect transcribe conversations. The language model may be regularly updated to include the current set of verbal triggers. Note that the language model would not have to accurately transcribe all speech in a conversation; mistakes do not matter except for those where a verbal trigger is mistakenly recognized. Various techniques may be used to reduce the number of false recognitions of verbal triggers. For example, the speech recognizer may require more than 1 verbal trigger (per call, per day, etc.) associated with the same relevant content before the relevant content is delivered.

To illustrate, the verbal triggers may consist of a list of words or phrases. For example, the words "vacation", "Caribbean" and "sailing", might be associated with advertisements for trips to the tropics. Alternatively, each trigger may consist of a network of words, for example, consisting of a stochastic language model like that of the overall conversation model in which the verbal triggers are embedded. These verbal triggers may be built up, for example, from descriptions provided by advertisers.

FIG. 2 illustrates an exemplary network 200 with the current invention for delivering relevant content. For example, a customer is using an IP device 144 to access communications services, e.g., to end and receive data and voice packets. The IP device 144 is connected to an access network 140. The packets originated by IP device 144, traverse access network 140 towards a router 142. The router 142 is connected to an IP/MPLS core network 110 through a border element 112. Packets originated by the IP devices 144 with destination end device 145, traverse the core network 110 from border element 112 towards a border element 113. The border element 113 is connected to an access network 141 through a router 143. Packets originated by end device 144 then reach the access network 141 through the router 143. End device 145 is connected to the access network 141.

In one embodiment, an application server 114 located in the IP/MPLS core network 110 is utilized for implementing the present invention to deliver relevant content. For example, the application server 114 may utilize a database server 210 for recording relevant content and associated verbal triggers. The application server 114 then utilizes one or more speech recognizers 220 for monitoring on-going conversations and identifying predefined verbal triggers, e.g., in near real time. In turn, the application server 114 may also engage media server 115 to communicate with each of the end devices 144 and 145 (i.e., delivering the identified relevant content) in a format that is compatible with the capabilities of the customers' end devices. For example, if the end device 145 is able to receive audio data but is incapable of receiving text data, then the media server will present the relevant content to end device 145 only in an audio format. However, if the end device 145 is able to receive audio data and text data (e.g., the end device having a display), then the media server will present the relevant content to the end device 145 in an audio format and/or text format. It should noted that if the end device is capable of receiving multimedia information, then the relevant content can also be presented in a multimedia format, e.g., having images or graphics.

In one embodiment, the service provider implements the current invention for presenting to callers and/or called parties content relevant to an on-going conversation on an IP network, e.g., advertising information, news information, weather information, traffic information, sports information, financial information, traveling information, information from various web locations (e.g., a webpage), caller contact information, call history information, or product catalog information, and the like. The service provider also enables customers to subscribe to this service by accessing application server 114. During the subscription process, the customer may specify the type of relevant content that the customer wants the network to present to the customer. Alternatively, the subscription process may not allow the customer to specify the type of relevant content that will be presented. For example, the subscriber may benefit from a lower calling rate (or possibly even having a free calling service), if the subscriber allows this service feature to be implemented, thereby allowing advertisers to present relevant content, e.g., targeted advertisings to the subscriber during a conversation. Under this scenario, the subscriber benefits from a lower calling rate, but at the expense of allowing his or her conversation being monitored for the purpose of receiving targeted advertisings.

The service provider may keep records of the relevant content and lists of verbal triggers for delivering the relevant content in the application server 114 or the database server 210. The lists of verbal triggers are to be used by the speech recognizer 220 to determine whether relevant content should be presented to a customer based on a monitored conversation. It should be noted that since new services and products are frequently introduced, the lists of verbal triggers and the recorded relevant contents are frequently updated as well.

In operation, when the customer initiates or receives a call (broadly defined as a voice communication), the application server 114 engages speech recognizer 220 to detect verbal triggers in the conversation between the called and calling parties. If a verbal trigger is detected, relevant content that is associated with that verbal trigger is delivered to the subscriber (the calling party and/or the called party). The relevant content may be delivered in a number of different formats via the media server 115. For example, relevant content may be delivered as an audio message on a subsequent call (e.g., presenting the relevant content before presenting a dial tone), a text message, an image, a Web page delivered during the conversation to the customer's screen (monitor), as a text or an image added to the customer's VoIP application, as email if provided by the subscriber, and so on.

Figure 3:
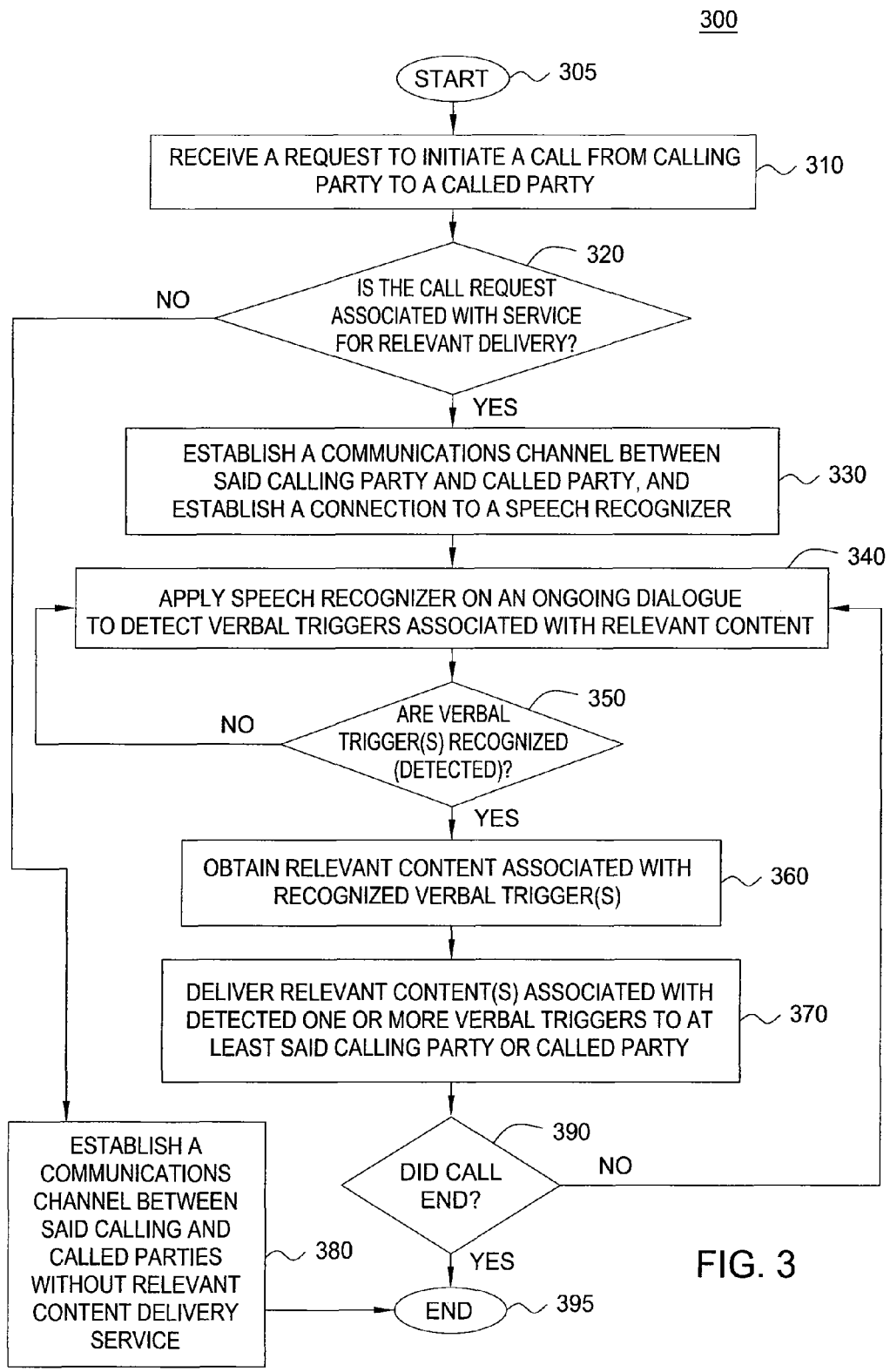
FIG. 3 illustrates a flowchart of the method for providing relevant content delivery service.

FIG. 3 illustrates a flowchart of method 300 for delivering relevant content. For example, a service provider may implement the current invention, e.g., via a service feature, for delivering relevant content in an IP related application server and enables the application server to utilize a speech recognizer for detecting verbal triggers associated with relevant contents. The application server is also enabled to engage a media server for delivering identified relevant content in a format that is compatible with a customer's end device.

Method 300 starts in step 305 and proceeds to step 310. In step 310, method 300 receives a request to initiate a call from a calling party to a called party. For example, a customer originates a VoIP call using a computer.

In step 320, method 300 determines whether or not the received request is associated with a service for delivering relevant content. For example, the call may be originated by a subscriber to a service for relevant content delivery. In another example, the called party is a subscriber to the service for relevant content delivery. If the call request is associated with service for delivering relevant content (specifically either the calling party, called party or both are subscribers), then the method proceeds to step 330. Otherwise, the method proceeds to step 380.

In step 330, method 300 establishes a communications channel between said calling party and called party, and establishes a connection to at least one speech recognizer. For example, a bridge can be implemented to allow the speech recognizer to monitor an on-going conversation between the calling party and the called party. The method then proceeds to step 340.

In step 340, method 300 applies the speech recognizer on an ongoing dialogue (e.g., conversation) to detect verbal triggers associated with relevant content. For example, the speech recognizer is analyzing a live conversation to detect at least one of the verbal triggers stored in a database.

In one embodiment, the speech recognizer continues to listen to the entire conversation whether or not verbal triggers are recognized. That means, the speech recognizer continues to listen for more verbal triggers even after a verbal trigger has been recognized. Alternatively, the number of possible verbal triggers that can be identified on a single conversation can be limited or predefined by the service provider.

In step 350, method 300 determines whether or not one or more verbal triggers are recognized. If said one or more verbal triggers are recognized, then the method proceeds to step 360. Otherwise, the method proceeds back to step 340 to continue monitoring for verbal triggers.

In step 360, method 300 obtains relevant content(s) associated with the one or more recognized verbal triggers. For example, the method may retrieve relevant content(s) from a database used to store relevant content associated with each of the verbal triggers. In another example, if the relevant content is not found or stored locally, then the method may search for relevant content on the Internet, e.g., find relevant websites, relevant advertisements, etc.

In step 370, method 300 delivers the relevant content to a customer in a format that is compatible with the customer's end-device. Note that the customer(s) may be the calling party, called party or both. The method may utilize a media server to provide the relevant content to each customer of the service in a format compatible with his/her end device. For example, if a customer originated the call from a device with a screen, such as a personal computer, a hand-held Personal Digital Assistant (PDA), or a cell-phone like device, then the method may deliver relevant content to the device for display during a conversation. If the customer of the service is using an analog device, then the relevant content may be delivered only in an audio format. Note that if the VoIP service is initiated from a computer, the VoIP application on the computer may receive relevant content from the VoIP application server over an Internet connection. The Internet connection then may be used to carry the voice and the relevant content, simultaneously. The method then proceeds to step 390.

In step 380, method 300 establishes a communications channel between said calling and called parties without a relevant content delivery service. For example, neither the calling nor the called party have subscribed to the service. The call is then handled using a normal process without connecting to call to a speech recognizer. The method then proceeds to step 395.

In step 390, method 300 determines whether or not the call has ended. If the call has ended, then the method proceeds to step 395 to end processing the current request. Otherwise, the method proceeds to step 340 to continue detecting verbal triggers.

In one embodiment, the present method may defer the presentation of the relevant content to the customer. For example, the relevant content or a link to the relevant content can be determined during an ongoing conversation. However, the identified relevant content is presented to the customer at a later time, e.g., after the on-going conversation has ended. In one embodiment, the identified relevant content is presented to the customer when the customer accesses the VoIP application to make a next phone call. For example, the relevant content in an audio format can be played before presenting a dial tone. For example, if a customer's conversation pertains to a vacation to Alaska, then relevant content about Alaska (e.g., weather, hotels, best times for vacation, etc.) may be gathered and delivered when the customer accesses the VoIP service to make another call.

It should be noted that although the present invention is presented in the context of a packet network, the present invention is not so limited. For example, if a customer initiates a call from a device that does not have a screen, e.g., a telephone for Plain Old Telephone Service (POTS), then the present method may still provide the relevant content in an audio only format.

In one embodiment, if a customer is using a device with display capabilities, then the customer may receive multiple relevant contents on the display. In one example, the relevant contents may be added incrementally to a scrollable portion of the display (screen) while keeping a history of previously delivered relevant contents. This will allow the customer to review various stored relevant contents at a later time.

In one embodiment, links such as Universal Resource Locators (URLs) may also be added as relevant content, e.g., for advertising purposes. For example, a link may be provided to enable click-to-dial (broadly a call access function) such that the caller may communicate with the company that is providing the advertisings. In another example, a link may be provided to enable a conference call bridging function such that the caller may add other parties to a current conversation.

In one embodiment, the current invention may be used to offer a VoIP service at a reduced price or for free to subscribers who are willing to accept content-relevant advertisings. In this fashion, an advertiser may subsidize a customer's call, but the advertiser is able to present a targeted advertisement to a caller who will likely be receptive to the targeted advertisement since the relevant content was determined from one or more verbal triggers.

It should be noted that although the present invention is described above in the context of a network implemented invention, the present invention is not so limited. Namely, the present invention can be implemented on a customer premise equipment, e.g., a local server. In fact, the present invention can be implemented at the endpoint device itself.

Figure 4:
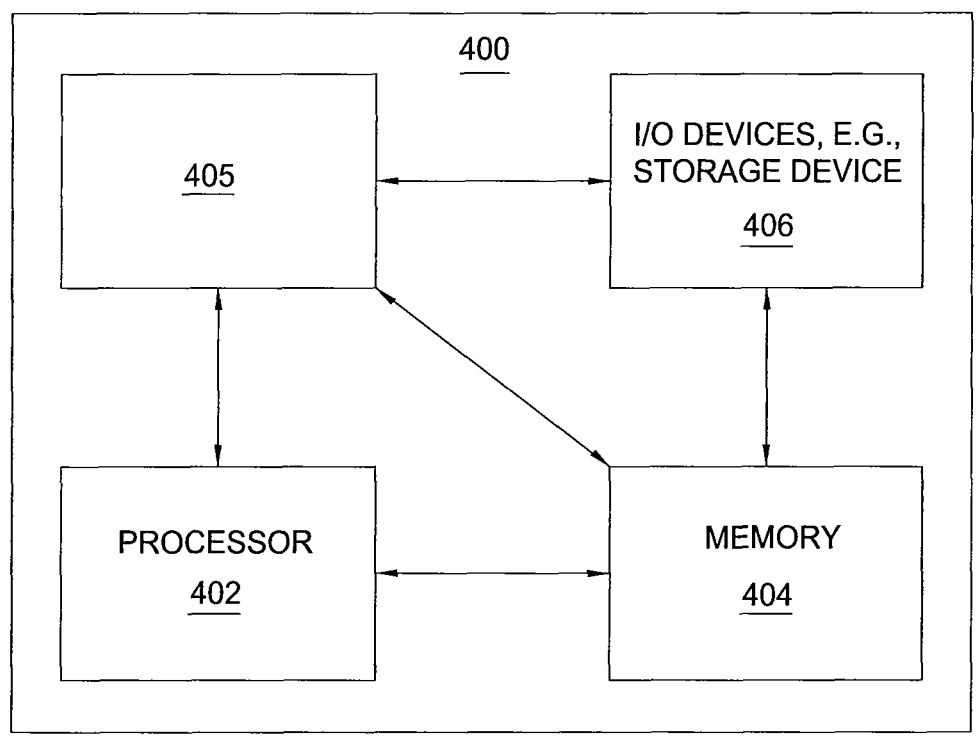
FIG. 4 illustrates a high-level block diagram of a general-purpose computer suitable for use in performing the functions described herein.

FIG. 4 depicts a high-level block diagram of a general-purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for providing a service for relevant content delivery, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, alarm interfaces, power relays and the like)).

It should be noted that the present invention can be implemented in software and/or in a combination of software and hardware, e.g., using application specific integrated circuits (ASIC), a general-purpose computer or any other hardware equivalents. In one embodiment, the present module or process 405 for providing a service for relevant content delivery can be loaded into memory 404 and executed by processor 402 to implement the functions as discussed above. As such, the present method 405 for providing a service for relevant content delivery (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing relevant content in a communication network, comprising:
    receiving, by a processor, a request to initiate a call between two parties;
    establishing, by the processor, a voice communication connection between the two parties and a communication connection to a speech recognizer, wherein the communication connection to the speech recognizer is established only if one of the two parties is a subscriber to a content delivery service;
    monitoring, by the processor, a conversation between the two parties over the voice communication connection via the speech recognizer for detecting a plurality of instances of a verbal trigger during the conversation; and
    delivering, by the processor, the relevant content that is associated with the verbal trigger to the subscriber when a threshold number of instances of the verbal trigger is detected during more than one call over a duration of a day, wherein the relevant content is delivered in an audio format over the voice communication connection to the subscriber while the conversation is still ongoing.

2. The method of claim 1, wherein the communication network is a packet network.

3. The method of claim 1, wherein the relevant content comprises advertising information.

4. The method of claim 1, wherein the relevant content contains a call access function.

5. The method of claim 1, wherein the relevant content comprises news information.

6. The method of claim 1, wherein the relevant content comprises weather information.

7. The method of claim 1, wherein the relevant content comprises traffic information.

8. The method of claim 1, wherein the relevant content comprises sports information.

9. The method of claim 1, wherein the relevant content comprises financial information.

10. The method of claim 1, wherein the relevant content comprises traveling information.

11. The method of claim 1, wherein the relevant content comprises information from a web location.

12. A non-transitory computer-readable medium having storing instructions which, when executed by a processor, cause the processor to perform operations for providing relevant content in a communication network, the operations comprising:
    receiving a request to initiate a call between two parties;
    establishing a voice communication connection between the two parties and a communication connection to a speech recognizer, wherein the communication connection to the speech recognizer is established only if one of the two parties is a subscriber to a content delivery service;
    monitoring a conversation between the two parties over the voice communication connection via the speech recognizer for detecting a plurality of instances of a verbal trigger during the conversation; and
    delivering the relevant content that is associated with the verbal trigger to the subscriber when a threshold number of instances of the verbal trigger is detected during more than one call over a duration of a day, wherein the relevant content is delivered in an audio format over the voice communication connection to the subscriber while the conversation is still ongoing.

13. The non-transitory computer-readable medium of claim 12, wherein the communication network is a packet network.

14. The non-transitory computer-readable medium of claim 12, wherein the relevant content comprises advertising information.

15. The non-transitory computer-readable medium of claim 12, wherein the relevant content comprises news information.

16. The non-transitory computer-readable medium of claim 12, wherein the relevant content comprises weather information.

17. The non-transitory computer-readable medium of claim 12, wherein the relevant content comprises traffic information.

18. The non-transitory computer-readable medium of claim 12, wherein the relevant content comprises sports information.

19. The non-transitory computer-readable medium of claim 12, wherein the relevant content comprises financial information.

20. An apparatus for providing relevant content in a communication network, comprising:
    a processor; and
    a computer-readable medium storing instructions which, when executed by the processor, cause the processor to perform operations, the operations comprising:
        receiving a request to initiate a call between two parties;
        establishing a communication connection between the two parties and a communication connection to a speech recognizer, wherein the communication connection to the speech recognizer is established only if one of the two parties is a subscriber to a content delivery service;
        monitoring a conversation between the two parties over the communication connection via the speech recognizer for detecting a plurality of instances of a verbal trigger during the conversation; and
        delivering the relevant content that is associated with the verbal trigger to the subscriber when a threshold number of instances of the verbal trigger is detected during more than one call over a duration of a day, wherein the relevant content is delivered by the media server in an audio format over the voice communication connection to the subscriber while the conversation is still ongoing.

* * * * *